United States Patent
Takimoto et al.

(10) Patent No.: US 9,708,487 B2
(45) Date of Patent: Jul. 18, 2017

(54) AROMATIC POLYCARBONATE RESIN COMPOSITION AND OPTICAL MOLDED ARTICLE

(75) Inventors: Masami Takimoto, Chiba (JP); Yasunobu Yamazaki, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 14/364,943

(22) PCT Filed: Sep. 6, 2012

(86) PCT No.: PCT/JP2012/072810
§ 371 (c)(1),
(2), (4) Date: Jul. 2, 2014

(87) PCT Pub. No.: WO2013/088796
PCT Pub. Date: Jun. 20, 2013

(65) Prior Publication Data
US 2014/0350148 A1 Nov. 27, 2014

(30) Foreign Application Priority Data
Dec. 13, 2011 (JP) .................................. 2011-272428

(51) Int. Cl.
| | | |
|---|---|---|
| *C08L 69/00* | (2006.01) | |
| *C08K 5/1515* | (2006.01) | |
| *C08K 5/524* | (2006.01) | |
| *C08K 5/54* | (2006.01) | |
| *C08L 63/00* | (2006.01) | |
| *G02B 1/04* | (2006.01) | |
| *C08K 5/527* | (2006.01) | |

(52) U.S. Cl.
CPC ............ *C08L 69/00* (2013.01); *C08K 5/1515* (2013.01); *C08K 5/527* (2013.01); *G02B 1/04* (2013.01); *G02B 1/041* (2013.01); *G02B 1/045* (2013.01)

(58) Field of Classification Search
None
See application file for complete search history.

(56) References Cited

U.S. PATENT DOCUMENTS

| | | | | |
|---|---|---|---|---|
| 5,364,926 A | * | 11/1994 | Sakashita ............. | C08G 64/307 524/611 |
| 2006/0263545 A1 | | 11/2006 | Coenjarts et al. | |
| 2006/0263546 A1 | | 11/2006 | Gurel et al. | |
| 2006/0263547 A1 | | 11/2006 | Cojocariu et al. | |
| 2007/0299168 A1 | * | 12/2007 | Ariki ...................... | C08K 5/103 524/91 |
| 2008/0287610 A1 | * | 11/2008 | Ishikawa ............. | C08G 64/183 525/391 |

(Continued)

FOREIGN PATENT DOCUMENTS

| | | |
|---|---|---|
| CN | 1204664 A | 1/1999 |
| CN | 101213256 A | 7/2008 |
| CN | 101317106 A | 12/2008 |

(Continued)

OTHER PUBLICATIONS

Doverphos S-9228 Technical Data Brochure, Jun. 10, 2011.*
Combined Chinese Office Action and Search Report issued Jul. 1, 2015 in Patent Application No. 201280060927.3 (with English translation of categories of cited documents).
International Search Report Issued Oct. 2, 2012 in PCT/JP12/072810 Filed Sep. 6, 2012.
Extended European Search Report issued Jun. 25, 2015 in Patent Application No. 12856763.3.

(Continued)

*Primary Examiner* — Christopher M Rodd
(74) *Attorney, Agent, or Firm* — Oblon, McClelland, Maier & Neustadt, L.L.P.

(57) ABSTRACT

Provided are an aromatic polycarbonate resin composition, including, with respect to 100 parts by mass of an aromatic polycarbonate resin (A), 0.005 to 0.5 parts by mass of a diphosphite compound (B) represented by the following general formula (I) and 0.001 to 0.5 parts by mass of an alicyclic epoxy compound (C), and an optical molded article:

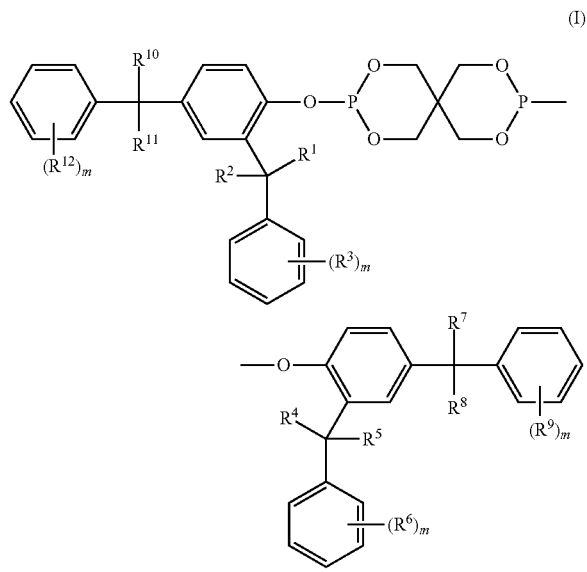

in the formula (I), $R^1$, $R^2$, $R^4$, $R^5$, $R^7$, $R^8$, $R^{10}$, and $R^{11}$ each independently represent a hydrogen atom, an alkyl group, or the like, $R^3$, $R^6$, $R^9$, and $R^{12}$ each independently represent an alkyl group, an aryl group, an aralkyl group, or the like, and m each independently represent an integer of 0 to 3.

10 Claims, No Drawings

(56) References Cited

U.S. PATENT DOCUMENTS

2009/0093583 A1     4/2009   Kawato et al.
2011/0272648 A1    11/2011   Fukushima et al.

FOREIGN PATENT DOCUMENTS

| CN | 101585961 A | 11/2009 |
|---|---|---|
| CN | 101772548 A | 7/2010 |
| EP | 0 885 929 A1 | 12/1998 |
| EP | 1 512 723 | 3/2005 |
| JP | 9 20860 | 1/1997 |
| JP | 11 71512 | 3/1999 |
| JP | 11 158364 | 6/1999 |
| JP | 2005 290320 | 10/2005 |
| JP | 2006 111713 | 4/2006 |
| JP | 2007 16079 | 1/2007 |
| JP | 4069364 | 4/2008 |
| JP | 2008 540808 | 11/2008 |
| JP | 2009 40843 | 2/2009 |
| JP | 2009 298994 | 12/2009 |
| TW | 201035062 | 10/2010 |

OTHER PUBLICATIONS

Office Action issued Jan. 26, 2016, in corresponding in Taiwan Patent Application No. 101137838.

\* cited by examiner

AROMATIC POLYCARBONATE RESIN COMPOSITION AND OPTICAL MOLDED ARTICLE

CROSS REFERENCE TO RELATED APPLICATIONS

The present application is a 35 U.S.C. §371 national stage patent application of International patent application PCT/JP2012/072810, filed on Sep. 6, 2012, published as WO/2013/088796 on Jun. 20, 2013, the text of which is incorporated by reference, and claims the benefit of the filing date of Japanese application no. 2011-272428, filed on Dec. 13, 2011, the text of which is also incorporated by reference.

TECHNICAL FIELD

The present invention relates to an aromatic polycarbonate resin composition and an optical molded article, and more specifically, to an aromatic polycarbonate resin composition excellent in light transmittance, luminance, and heat stability in high-temperature molding, and capable of providing a molded part that does not discolor or deteriorate even when exposed to a high-temperature and high-humidity environment for a long time period and that is excellent in light permeability, the resin composition being useful as an optical molded article, in particular, a light-guiding plate, and an optical molded article obtained by molding the composition.

BACKGROUND ART

An aromatic polycarbonate resin is excellent in, for example, transparency, mechanical property, thermal property, electrical property, and weatherability, and has been used in an optical molded article such as a light-guiding plate, a lens, or an optical fiber by taking advantage of its characteristics. A material for the optical molded article is required to have high light-guiding performance, and hence the development of a polycarbonate copolymer that improves the light-guiding performance and the improvement of the performance with various additives have been performed.

For example, the following methods have been disclosed: a method involving blending a bead-like crosslinked acrylic resin and a fluorescent whitener to reduce the luminance unevenness of the aromatic polycarbonate resin, and to make the resin excellent in color tone and surface light-emitting property (see, for example, Patent Document 1); a method involving blending an acrylic resin having a specific molecular weight, or blending a polyalkylene glycol or a fatty acid ester thereof, to improve the total light transmittance of the polycarbonate resin while maintaining its characteristics (see, for example, Patent Documents 2 and 3); a method involving setting a tin content in a polycarbonate copolymer, the copolymer to be used having a specific repeating unit, to a certain amount or less, or blending a light-diffusing agent or a specific phosphite compound as an antioxidant, to reduce the discoloration of a polycarbonate resin composition at the time of high-temperature molding while improving its flowability (see, for example, Patent Documents 4 to 6); and a method involving blending a silicone crosslinked particle and a specific phosphite compound as antioxidants to make the heat stability of the resin excellent to the extent that a large injection-molded article can be molded (see, for example, Patent Document 7).

Further, display products having larger screens and smaller thicknesses than those of conventional products such as a smart phone and a tablet PC have started to become widespread in recent years, and hence there has been a growing demand for a high-flowability material.

As a method of improving the flowability of an aromatic polycarbonate resin composition, there has been known, for example, a method involving reducing its molecular weight or such a method involving combining the composition with a polycarbonate copolymer, which is obtained by copolymerizing a polyether diol such as polytetramethylene glycol, to improve the flowability as disclosed in each of Patent Documents 4 to 6. In addition, to add a phosphite (phosphorous acid ester)-based antioxidant to the aromatic polycarbonate resin composition as disclosed in each of Patent Documents 6 and 7 has been known as a countermeasure against the deterioration or yellowing of the composition at the time of its high-temperature molding.

CITATION LIST

Patent Document

[Patent Document 1] JP 09-20860 A
[Patent Document 2] JP 11-158364 A
[Patent Document 3] JP 4069364 B2
[Patent Document 4] JP 2009-298994 A
[Patent Document 5] JP 2007-16079 A
[Patent Document 6] JP 2009-40843 A
[Patent Document 7] JP 2006-111713 A

SUMMARY OF INVENTION

Technical Problem

However, when the molecular weight of the aromatic polycarbonate resin composition is reduced or its flowability is improved with the high-flowability polycarbonate copolymer, a problem arises in that its moisture-resisting performance reduces. In addition, the phosphite-based antioxidant is liable to hydrolyze Accordingly, even after the composition has been processed into a light-guiding plate, the antioxidant hydrolyzes in a moist heat resistance test to be performed under the conditions of a temperature and humidity equal to or more than certain values, thereby causing a problem in that the light-guiding plate discolors or becomes opaque to reduce the light-guiding performance of the light-guiding plate.

Further, a light-guiding plate using a low-molecular weight aromatic polycarbonate resin composition improved in flowability involves the following problem: after a moist heat resistance test for evaluating the performance of the light-guiding plate, a crack is liable to occur in the light-guiding plate and hence an internal defect is liable to be produced. The internal crack occurs more vigorously as the conditions of a humidity and a temperature become more severe, or the molecular weight becomes lower. In the case of, for example, a test in a constant temperature and humidity chamber at 60° C. and 90% RH as general moist heat resistance conditions for about 1,000 hours, a crack occurs only to the extent that no problems arise when the molecular weight is 13,000 or more. However, when the molecular weight is 13,000 or less, many cracks occur even under the conditions. Even when a crack occurs, the crack closes over time, so the problem of cracks is dissolved. However, when the molecular weight is low, the crack remains as a flaw without closing to preclude the light-guiding plate from functioning in some cases.

The present invention has been made in view of the circumstances, and an object of the present invention is to provide a resin composition excellent in heat stability in high-temperature molding and capable of providing a molded article that is excellent in light transmittance and luminance, and that does not cause discoloration or an internal crack after a moist heat resistance test, and an optical molded article.

Solution to Problem

As a result of their extensive studies, the inventors of the present invention have found that the problems can be solved by blending an aromatic polycarbonate resin with specific amounts of a specific diphosphite compound and an alicyclic epoxy compound.

That is, the present invention relates to the following resin composition and optical molded article.

1. An aromatic polycarbonate resin composition, comprising, with respect to 100 parts by mass of an aromatic polycarbonate resin (A), 0.005 to 0.5 parts by mass of a diphosphite compound (B) represented by the following general formula (I) and 0.001 to 0.5 parts by mass of an alicyclic epoxy compound (C).

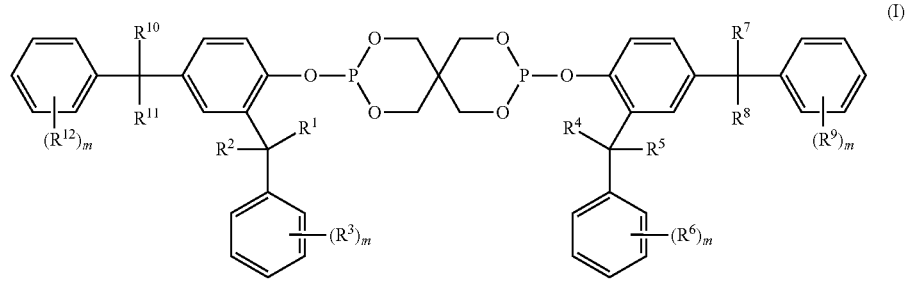

(I)

In the formula (I), $R^1$, $R^2$, $R^4$, $R^5$, $R^7$, $R^8$, $R^{10}$, and $R^{11}$ each independently represent a hydrogen atom or an alkyl group having 1 to 4 carbon atoms that may have a substituent, $R^3$, $R^6$, $R^9$, and $R^{12}$ each independently represent a group selected from an alkyl group having 1 to 4 carbon atoms, an aryl group having 6 to 12 carbon atoms, and an aralkyl group having 7 to 12 carbon atoms, and m each independently represent an integer of 0 to 3.

2. The aromatic polycarbonate resin composition according to the item 1, in which the aromatic polycarbonate resin (A) contains 0 to 150 parts by mass of a polycarbonate copolymer having repeating units represented by the following general formulae (a-1) and (a-2) with respect to 100 parts by mass of an aromatic polycarbonate resin:

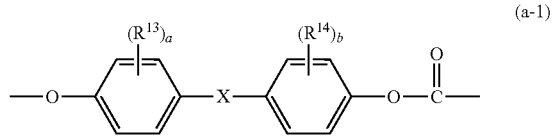
(a-1)

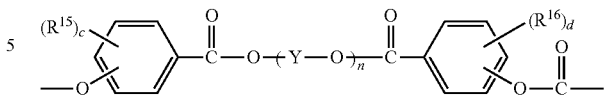
(a-2)

In the formula (a-1), $R^{13}$ and $R^{14}$ each independently represent an alkyl group having 1 to 6 carbon atoms, X represents a bond selected from a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, and —CO—, and a and b each independently represent an integer of 0 to 4; and in the formula (a-2), $R^{15}$ and $R^{16}$ each independently represent an alkyl group having 1 to 3 carbon atoms, Y represents a linear or branched alkylene group having 2 to 15 carbon atoms, c and d each independently represent an integer of 0 to 4, and n represents an integer of 2 to 200.

3. The aromatic polycarbonate resin composition according to the item 1 or 2, in which the diphosphite compound (B) is bis(2,4-dicumylphenyl)pentaerythritol diphosphite.

4. The aromatic polycarbonate resin composition according to any one of the items 1 to 3, in which a residual sodium content in the diphosphite compound (B) is 3 ppm by mass or less.

5. The aromatic polycarbonate resin composition according to any one of the items 1 to 4, in which the alicyclic epoxy compound (C) includes 3,4-epoxycyclohexenylmethyl-3',4'-epoxycyclohexenecarboxylate and/or a 1,2-epoxy-4-(2-oxiranyl)cyclohexane adduct of 2,2-bis(hydroxymethyl)-1-butanol.

6. The aromatic polycarbonate resin composition according to any one of the items 1 to 5, further comprising 0.01 to 1 parts by mass of a modified silicone compound with respect to 100 parts by mass of the aromatic polycarbonate resin (A).

7. The aromatic polycarbonate resin composition according to any one of the items 1 to 6, in which per 100 g of a pellet obtained by melting and kneading the aromatic polycarbonate resin composition, the number of foreign matters each having a size of 50 μm or more is 5 or less, the number of foreign matters each having a size of 20 μm or more and less than 50 μm is 20 or less, and the number of foreign matters each having a size of 5 μm or more and less than 20 μm is 200 or less.

8. The aromatic polycarbonate resin composition according to the item 7, in which the pellet has a viscosity-average molecular weight of 13,000 or less in terms of the aromatic polycarbonate resin.

9. An optical molded article, which is obtained by molding the aromatic polycarbonate resin composition according to any one of the items 1 to 8.

Advantageous Effects of Invention

The aromatic polycarbonate resin composition of the present invention is excellent in heat stability in high-temperature molding, and the use of the resin composition can provide an optical molded article that is excellent in light transmittance and luminance, that does not cause discoloration or an internal crack after a moist heat resistance test, and that is excellent in light permeability.

Further, the aromatic polycarbonate resin composition of the present invention has a molecular weight as low as, for example, 13,000 or less, and can be turned into a light-guiding plate that does not cause a crack even when exposed to a high-temperature and high-humidity environment for a long time period.

DESCRIPTION OF EMBODIMENTS

[Aromatic Polycarbonate Resin (A)]

In the present invention, a resin produced by a known production method, i.e., by causing a dihydric phenol and a carbonate precursor such as phosgene or a carbonic acid ester compound to react with each other can be used as an aromatic polycarbonate resin (hereinafter sometimes referred to as "aromatic PC resin") as a component (A).

A specific example thereof is an aromatic polycarbonate resin produced by, for example, a reaction between the dihydric phenol and the carbonate precursor such as phosgene or an ester exchange reaction between the dihydric phenol and the carbonate precursor such as a carbonic acid ester compound in an inert solvent such as dichloromethane in the presence of a known molecular weight modifier and a branching agent to be added as required.

Various phenols are available as the dihydric phenol. Among them, 2,2-bis(4-hydroxyphenyl)propane [common name: bisphenol A] is particularly suitable.

As a bisphenol other than bisphenol A, there are given, for example: bis(hydroxyaryl)alkanes such as bis(4-hydroxyphenyl) methane, 1,1-bis(4-hydroxyphenyl)ethane, 2,2-bis (4-hydroxyphenyl)butane, 2,2-bis(4-hydroxyphenyl)octane, 2,2-bis(4-hydroxyphenyl)phenylmethane, 2,2-bis(4-hydroxy-1-methylphenyl) propane, bis(4-hydroxyphenyl) naphthylmethane, 1,1-bis(4-hydroxy-t-buthylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl) propane; bis(hydroxyaryl)cycloalkanes such as 1,1-bis(4-hydroxyphenyl)cyclopentane, 1,1-bis(4-hydroxyphenyl)cyclohexane, and 1,1-bis(4-hydroxyphenyl)-3,5,5-trimethylcyclohexane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; dihydroxydiaryladamantanes such as 1,3-bis(4-hydroxyphenyl)adamantane, 2,2-bis(4-hydroxyphenyl) adamantane, and 1,3-bis(4-hydroxyphenyl)-5, 7-dimethyladamantane; bis(4-hydroxyphenyl)diphenylmethane; 4,4'-[1,3-phenylenebis(1-methylethylidene)] bisphenol; 10,10-bis(4-hydroxyphenyl)-9-anthrone; 1,5-bis (4-hydroxyphenylthio)-2,3-dioxapentaene; and an $\alpha,\omega$-bishydroxyphenylpolydimethylsiloxane compound. One of those dihydric phenols may be used alone, or two or more thereof may be mixed and used.

Any molecular weight modifier can be used without any particular limitation as long as the modifier is typically used in the polymerization of a polycarbonate resin. Specific examples thereof include monohydric phenols such as phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, a monoalkylphenol having a linear or branched alkyl group having an average number of carbon atoms of 12 to 35 at the ortho-, meta-, or para-position, 9-(4-hydroxyphenyl)-9-(4-methoxyphenyl)fluorene, 9-(4-hydroxy-3-methylphenyl)-9-(4-methoxy-3-methylphenyl) fluorene, and 4-(1-adamantyl)phenol. One of those monohydric phenols may be used alone, or two or more thereof may be mixed and used.

Examples of the carbonic acid ester compound include: diaryl carbonates such as diphenyl carbonate; and dialkyl carbonates such as dimethyl carbonate and diethyl carbonate. One of those compounds may be used alone, or two or more thereof may be used in combination.

For example, the following compound having three or more functional groups may be used as the branching agent: 1,1,1-tris(4-hydroxyphenyl)ethane, $\alpha,\alpha',\alpha''$-tris(4-hydroxyphenyl)-1,3,5-triisopropylbenzene, 1-[$\alpha$-methyl-$\alpha$-(4'-hydroxyphenyl)ethyl]-4-[$\alpha',\alpha'$-bis(4"-hydroxyphenyl)ethyl] benzene, phloroglucin, trimellitic acid, or isatinbis (o-cresol). One of those branching agents may be used alone, or two or more thereof may be used in combination.

Examples of the inert organic solvent include: chlorinated hydrocarbons such as dichloromethane, trichloromethane, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, and chlorobenzene; toluene; and acetophenone. Among them, dichloromethane is particularly suitable. One of those inert organic solvents may be used alone, or two or more thereof may be used in combination.

(Polycarbonate Copolymer)

Although a homoaromatic polycarbonate resin can be used alone as the aromatic polycarbonate resin as the component (A) in the present invention, a mixture of the homoaromatic polycarbonate resin, and a polycarbonate copolymer (hereinafter sometimes referred to as "PC copolymer") having repeating units represented by the following general formulae (a-1) and (a-2) can also be used from the viewpoint of improving the flowability of a resin composition without reducing its viscosity-average molecular weight.

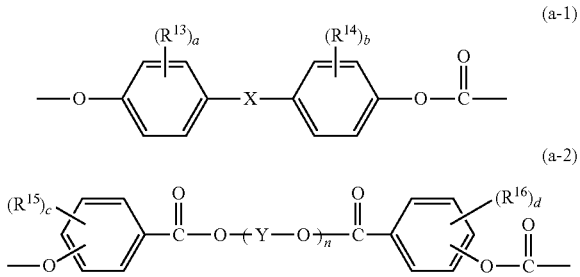

In the formula (a-1), $R^{13}$ and $R^{14}$ each independently represent an alkyl group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of 0 to 4.

In addition, in the formula (a-2), $R^{15}$ and $R^{16}$ each independently represent an alkyl group having 1 to 3 carbon atoms, Y represents a linear or branched alkylene group having 2 to 15 carbon atoms, c and d each independently represent an integer of 0 to 4, and n represents an integer of 2 to 200.

The PC copolymer can be produced by a common production method called an interfacial polymerization method. That is, the copolymer can be produced by a method involving causing a dihydric phenol, a phenol-modified diol, and a carbonate precursor such as phosgene to react with one another. Specifically, in an inert solvent such as dichloromethane, in the presence of a known molecular weight modifier, and a catalyst or branching agent to be added as required, the dihydric phenol, the phenol-modified diol, and the carbonate precursor such as phosgene are caused to react with one another.

<Dihydric Phenol>

Examples of the dihydric phenol can include compounds each represented by the following general formula (a-1a).

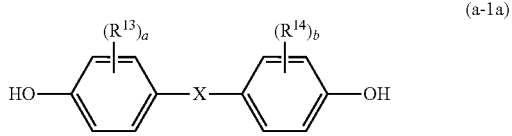

In the general formula (a-1a), $R^{13}$ and $R^{14}$ each independently represent an alkyl group having 1 to 6 carbon atoms, and the alkyl group may be any one of linear, branched, and cyclic alkyl groups. Examples of the alkyl group having 1 to 6 carbon atoms include a methyl group, an ethyl group, a n-propyl group, an isopropyl group, a n-butyl group, an isobutyl group, a tert-butyl group, a n-pentyl group, an isopentyl group, a n-hexyl group, an isohexyl group, an cyclopentyl group, and a cyclohexyl group.

a and b represent the substitution numbers of $R^{13}$ and $R^{14}$, respectively, and each represent an integer of 0 to 4. It should be noted that when a plurality of $R^{13}$ exist, the plurality of $R^{13}$ may be identical to or different from each other, and when a plurality of $R^{14}$ exist, the plurality of $R^{14}$ may be identical to or different from each other.

X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, or a —S—, —SO—, —SO$_2$—, —O—, or —CO— bond.

Examples of the alkylene group having 1 to 8 carbon atoms include a methylene group, an ethylene group, a propylene group, a butylene group, a pentylene group, and a hexylene group. Examples of the alkylidene group having 2 to 8 carbon atoms include an ethylidene group and an isopropylidene group. Examples of the cycloalkylene group having 5 to 15 carbon atoms include a cyclopentylene group and a cyclohexylene group. Examples of the cycloalkylidene group having 5 to 15 carbon atoms include a cyclopentylidene group and a cyclohexylidene group.

Various phenols are available as the dihydric phenol represented by the general formula (a-1a). Among them, 2,2-bis(4-hydroxyphenyl)propane [common name: bisphenol A] is particularly suitable. Those exemplified in the dihydric phenol to be used in the production of the aromatic PC resin can each be used as a bisphenol except bisphenol A.

Various products can be used as the inert organic solvent, the molecular weight modifier, and the branching agent as long as the products are typically used in the polymerization of a PC resin. Specifically, those exemplified in the inert organic solvent, molecular weight modifier, and branching agent to be used in the production of the aromatic PC resin can be used.

A phase-transfer catalyst such as a tertiary amine or a salt thereof, a quaternary ammonium salt, or a quaternary phosphonium salt can be preferably used as the catalyst. Examples of the tertiary amine include triethylamine, tributylamine, N,N-dimethylcyclohexylamine, pyridine, and dimethylaniline. In addition, examples of the tertiary amine salt include hydrochloric acid salts and bromic acid salts of these tertiary amines. Examples of the quaternary ammonium salt include trimethylbenzylammonium chloride, triethylbenzylammonium chloride, tributylbenzylammonium chloride, trioctylmethylammonium chloride, tetrabutylammonium chloride, and tetrabutylammonium bromide. Examples of the quaternary phosphonium salt include tetrabutylphosphonium chloride and tetrabutylphosphonium bromide. One of those catalysts may be used alone, or two or more thereof may be used in combination.

<Phenol-Modified Diol>

The phenol-modified diol is a compound represented by the following general formula (a-2a).

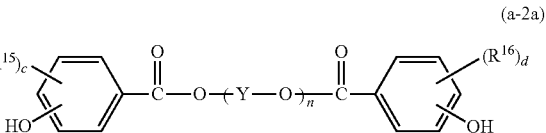

In the general formula (a-2a), $R^{15}$ and $R^{16}$ each independently represent an alkyl group having 1 to 3 carbon atoms, and examples thereof include a methyl group, an ethyl group, a n-propyl group, and an isopropyl group.

Y represents a linear or branched alkylene group having 2 to 15 carbon atoms. Examples thereof include: linear alkylene groups such as an ethylene group, a propylene group, a butylene group, an isobutylene group, a pentylene group, and an isopentylene group; and alkylidene groups such as an ethylidene group, a propylidene group, an isopropylidene group, a butylidene group, an isobutylidene group, a pentylidene group, and an isopentylidene group.

c and d represent the substitution numbers of $R^{15}$ and $R^{16}$, respectively, and each represent an integer of 0 to 4. It should be noted that when a plurality of $R^{15}$ exist, the plurality of $R^{15}$ may be identical to or different from each other, and when a plurality of $R^{16}$ exist, the plurality of $R^{16}$ may be identical to or different from each other. n represents the number of —Y—O— repeating units, and represents an integer of 2 to 200.

The phenol-modified diol represented by the general formula (a-2a) is, for example, a compound derived from hydroxybenzoic acid, or an alkyl ester or acid chloride thereof and a polyether diol. Although the phenol-modified diol can be synthesized by a method proposed in, for example, JP 62-79222 A, JP 60-79072 A, or JP 2002-173465 A, the phenol-modified diol obtained by any such method is desirably purified as appropriate. A method for the purification is desirably, for example, a method involving reducing a pressure in a system in the latter stage of the reaction and removing an excess raw material (such as p-hydroxybenzoic acid) by distillation, or a method involving washing the phenol-modified diol with water, an alkali aqueous solution (such as an aqueous solution of sodium hydrogen carbonate), or the like.

Typical examples of the hydroxybenzoic acid alkyl ester include a hydroxybenzoic acid methyl ester and a hydroxybenzoic acid ethyl ester. The polyether diol is represented by HO—(Y—O)$_n$—H (Y and n each have the same meaning as that described in the foregoing), and has a repeating unit formed of a linear or branched oxyalkylene group having 2 to 15 carbon atoms. Specific examples thereof include polyethylene glycol, polypropylene glycol, and polytetramethylene glycol. Among them, polytetramethylene glycol is particularly preferred from the viewpoints of availability and hydrophobicity. The repetition number n of the oxyalkylene groups of the polyether diol is preferably 2 to 200, more preferably 6 to 70. When n is 2 or more, the following advantage is obtained: efficiency upon copolymerization of the phenol-modified diol is good. When n is 200 or less, the following advantage is obtained: a reduction in heat resistance of the PC copolymer is small.

A typical example of the acid chloride is an acid chloride obtained from hydroxybenzoic acid and phosgene. More specifically, the acid chloride can be obtained by a method described in, for example, JP 2652707 B2. Hydroxybenzoic acid or the alkyl ester thereof, which may be any one of a para form, a meta form, and an ortho form, is preferably a para form in terms of a copolymerization reaction. The ortho form of hydroxybenzoic acid or the alkyl ester thereof may be poor in reactivity of the copolymerization owing to steric hindrance on a hydroxyl group.

In the process of producing the PC copolymer, the phenol-modified diol is preferably used as a methylene chloride solution to the extent possible in order that change of properties thereof or the like may be prevented. When the diol cannot be used as a methylene chloride solution, the diol can be used as an alkali aqueous solution such as NaOH.

Increasing the copolymerization amount of the phenol-modified diol in the PC copolymer improves its flowability but reduces its heat resistance. Therefore, the copolymerization amount of the phenol-modified diol is preferably selected in consideration of a balance between desired flowability and desired heat resistance. When the copolymerization amount of the phenol-modified diol is excessively large, as described in JP 62-79222 A, the copolymer is brought into an elastomer state and hence may be unable to find use in the same applications as those of a general PC resin. In order that resistance to heat at 100° C. or more may be maintained, the amount of a phenol-modified diol residue in the PC copolymer is preferably 1 to 15 mass %, more preferably 1 to 10 mass %, still more preferably 1 to 5 mass % in the present invention.

(Mixing Ratio)

As described above, in the present invention, a mixture of 100 parts by mass of a homoaromatic polycarbonate resin and 0 to 150 parts by mass of a polycarbonate copolymer can be used as the aromatic polycarbonate resin (A).

When the homoaromatic polycarbonate resin and the polycarbonate copolymer are used in combination, the amount of the polycarbonate copolymer is preferably 10 to 150 parts by mass, more preferably 10 to 100 parts by mass, still more preferably 25 to 60 parts by mass with respect to 100 parts by mass of the homoaromatic polycarbonate resin.

Mixing 100 parts by mass of the homoaromatic polycarbonate resin with 10 parts by mass or more of the polycarbonate copolymer can improve the flowability of the resin composition without significantly reducing its viscosity-average molecular weight (in terms of the aromatic PC resin, hereinafter sometimes simply referred to as "molecular weight"), and when the amount of the copolymer to be mixed is 150 parts by mass or less, a reduction in heat resistance of the composition can be prevented.

In addition, for example, when 100 parts by mass of an aromatic polycarbonate resin having a molecular weight of 15,000 are mixed with 50 parts by mass of a polycarbonate copolymer having a molecular weight of 14,000 obtained by copolymerizing 4 mass % of a comonomer, flowability comparable to that of an aromatic polycarbonate resin having a molecular weight of 13,000 or less is obtained. The flowability can be easily adjusted by arbitrarily changing the mixing amount of the polycarbonate copolymer as described above. Further, a resin composition having flowability comparable to that of an aromatic polycarbonate resin having a molecular weight of 10,000 or less, the composition being generally difficult to polymerize, can also be obtained because a polycarbonate copolymer having an arbitrary comonomer amount and an arbitrary molecular weight can be polymerized.

[Diphosphite Compound (B)]

In the present invention, an antioxidant represented by the following general formula (I) is used as a diphosphite compound as a component (B) from the viewpoints of the heat resistance and moist heat resistance of the resin composition.

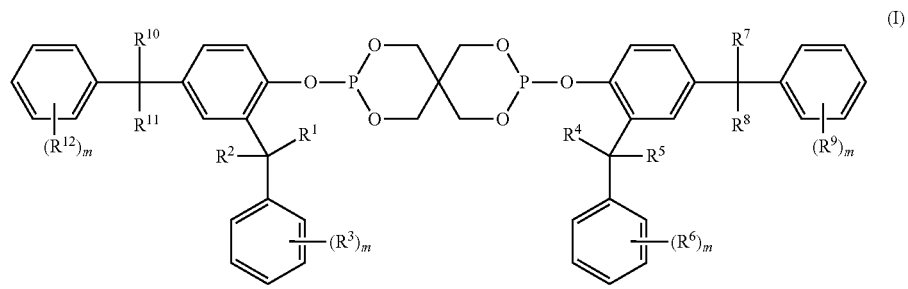

In the formula (I), $R^1$, $R^2$, $R^4$, $R^5$, $R^7$, $R^8$, $R^{10}$, and $R^{11}$ each independently represent a hydrogen atom or an alkyl group having 1 to 4 carbon atoms that may have a substituent.

$R^3$, $R^6$, $R^9$, and $R^{12}$ each independently represent a group selected from an alkyl group having 1 to 4 carbon atoms, an aryl group having 6 to 12 carbon atoms, and an aralkyl group having 7 to 12 carbon atoms.

m represent the substitution numbers of $R^3$, $R^6$, $R^9$, and $R^{12}$ and each independently represent an integer of 0 to 3.

Examples of the alkyl group having 1 to 4 carbon atoms include a methyl group, an ethyl group, a n-propyl group, an isopropyl group, a n-butyl group, an isobutyl group, and a tert-butyl group. Examples of the aryl group having 6 to 12 carbon atoms include a phenyl group, a tolyl group, a styryl group, a p-nitrophenyl group, a p-methoxyphenyl group, a p-ethoxyphenyl group, a biphenyl group, and a naphthyl group. Examples of the aralkyl group having 7 to 12 carbon atoms include a benzyl group, a 1-phenylethyl group, a 2-phenylethyl group, a 1-phenylisopropyl group, a 2-phenylisopropyl group, a phenyl-t-butyl group, an α-naphthylmethyl group, a 1-α-naphthylethyl group, and a 2-α-naphthylethyl group.

$R^1$, $R^2$, $R^4$, $R^5$, $R^7$, $R^8$, $R^{10}$, and $R^{11}$ each independently represent preferably a hydrogen atom or a methyl group. $R^3$, $R^6$, $R^9$, and $R^{12}$ each independently represent preferably a methyl group. m each independently represent preferably 0 or 1.

In addition, one of the diphosphite compounds each represented by the general formula (I) may be used alone, or two or more thereof may be used in combination.

It is because of the following reason that the diphosphite compound (B) represented by the general formula (I) has started to be used.

For example, a low-molecular weight polycarbonate resin composition having a molecular weight of less than 13,000 is generally liable to turn yellow in high-temperature molding. Meanwhile, the thinning of a light-guiding plate has been advanced and hence even a high-flowability resin composition may be molded at a temperature of 340° C. or more, or in some cases, exceeding 360° C. Accordingly, measures to prevent the yellowing of the low-molecular weight polycarbonate resin composition at the time of its high-temperature molding have been needed.

When a polycarbonate resin composition is subjected to injection molding, a phosphite-based antioxidant is most effective in preventing an oxidation action responsible for its yellowing. The antioxidant kneaded in the polycarbonate resin composition exhibits its anti-oxidizing action on a resin in an injection cylinder. However, when the heat resistance of the antioxidant to the temperature of the injection cylinder is insufficient, the antioxidant decomposes and gasifies in the injection cylinder without exhibiting the anti-oxidizing action to be responsible for the occurrence of silver. Such trouble involved in high-temperature molding is countered by using the phosphite-based antioxidant having high heat resistance, specifically, an antioxidant of a pentaerythritol diphosphite structure represented by the following formula.

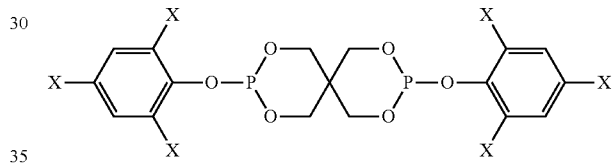

For example, bis(2,6-di-tert-butyl-4-methylphenyl)pentaerythritol diphosphite (a commercial product thereof is, for example, a product available under the trade name "ADK STAB PEP36" from ADEKA CORPORATION) has been known as a compound having the structure represented by the formula. The antioxidant exhibits a sufficient anti-oxidizing action without gasifying even in molding at a high temperature exceeding 340° C.

On the other hand, most of the phosphite-based antioxidants are liable to hydrolyze and hence the following problem is liable to arise: in a moist heat resistance test for a light-guiding plate, an antioxidant in the light-guiding plate hydrolyzes, and the light-guiding plate discolors or becomes opaque under an influence of the hydrolysate to reduce its light-guiding performance. Tris(2,4-di-tert-butylphenyl)phosphite represented by the following formula (a commercial product thereof is, for example, a product available under the trade name "Irgafos 168" from BASF Japan Ltd.) has been known as a phosphite-based antioxidant that hardly hydrolyzes. However, the antioxidant is not suitable for the high-temperature molding of a light-guiding plate because of the following reason: the antioxidant decomposes in the high-temperature molding of the light-guiding plate owing to its low heat resistance and hence its anti-oxidizing function is not exhibited.

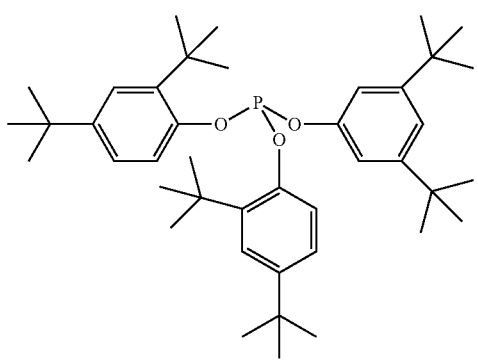 [SMILES: CC(C)(C)c1cc(OP(Oc2ccc(C(C)(C)C)cc2C(C)(C)C)Oc2ccc(C(C)(C)C)cc2C(C)(C)C)cc(C(C)(C)C)c1]

As a result of their extensive studies on, and searches for, an antioxidant capable of satisfying both required characteristics, i.e., heat resistance and hydrolysis resistance, the inventors have found that the component (B) represented by the general formula (I) to be used in the present invention has hydrolysis resistance comparable to that of tris(2,4-di-tert-butylphenyl)phosphite while having heat resistance equal to or higher than that of bis(2,6-di-tert-butyl-4-methylphenyl)pentaerythritol diphosphite.

Among the diphosphite compounds each represented by the general formula (I), bis(2,4-dicumylphenyl)pentaerythritol diphosphite represented by the following formula (I-1) (a commercial product thereof is, for example, a product available under the trade name "Doverphos S-9228PC" from Dover Chemical Corporation) is particularly suitable because the compound can satisfactorily impart heat resistance and hydrolysis resistance to the aromatic polycarbonate resin composition, and is easily available.

ing as a result of the passage of a step involving using a compound containing a sodium atom in the production of the antioxidant.

The component (B) whose residual sodium content is 3 ppm by mass or less can be produced by, for example, a process free of the step of washing with an aqueous solution of sodium hydroxide.

The content of the diphosphite compound (B) is 0.005 to 0.5 parts by mass, preferably 0.01 to 0.2 parts by mass, more preferably 0.02 to 0.1 parts by mass with respect to 100 parts by mass of the aromatic polycarbonate resin (A). A content of less than 0.005 parts by mass is not preferred because the compound does not function as an antioxidant. A content in excess of 0.5 parts by mass is not preferred because the compound reduces the flowability.

When the diphosphite compound (B) is used and the compound (B) is blended in an amount of, for example, 0.05 parts by mass with respect to 100 parts by mass of the aromatic polycarbonate resin (A) having a viscosity-average molecular weight of about 13,000 to 15,000, a light-guiding plate having high transparency can be obtained without yellowing even in molding at 360° C.

In addition, the light-guiding plate can be the following light-guiding plate: the plate does not discolor even when taken out of a thermo-hygrostat at 60° C. and 90% RH as general moist heat resistance conditions in which the plate has been placed for 1,000 hours. Even under additionally severe conditions (in a constant temperature and humidity chamber at 60° C. and 95% RH for 1,000 hours; in a constant temperature and humidity chamber at 85° C. and 85% RH for 500 hours; in a constant temperature and humidity chamber at 85° C. and 95% RH for 500 hours), the light-guiding plate can be such that no problems arise at the time of its use, though the plate shows some degree of discoloration.

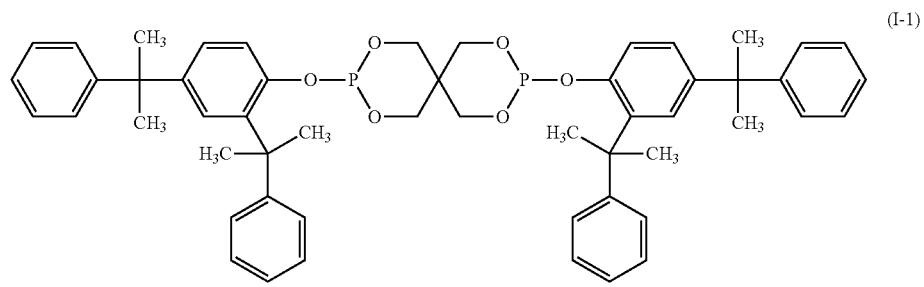 [SMILES: CC(C)(c1ccccc1)c1ccc(OP2OCC3(CO2)COP(Oc2ccc(C(C)(C)c4ccccc4)cc2C(C)(C)c2ccccc2)OC3)c(C(C)(C)c2ccccc2)c1]

(I-1)

Further, it has been found that the hydrolysis of the antioxidant is affected by a sodium content remaining in the polycarbonate resin composition and is also affected by a sodium content remaining in a process for the production of the antioxidant.

In addition, a sodium remaining in the antioxidant has high activity and acts on the polycarbonate resin to promote the hydrolysis, thereby causing the discoloration or deterioration of the resin.

In view of the foregoing, the residual sodium content in the diphosphite compound (B) is preferably 3 ppm by mass or less, more preferably 1 ppm by mass or less. When the residual sodium content is 3 ppm by mass or less, there is no possibility that the residual sodium affects the hydrolysis of the component (B).

The term "remaining sodium content (residual sodium content)" as used herein refers to a sodium content remain-

[Alicyclic Epoxy Compound (C)]

In the present invention, an alicyclic epoxy compound (C) is used from the viewpoint of an additional improvement in moist heat resistance of the resin composition.

For example, when the diphosphite compound (B) is added in an amount of 0.05 to 0.1 parts by mass to 100 parts by mass of a low-molecular weight aromatic polycarbonate resin having a molecular weight of 13,000 or less as the component (A) or of the component (A) having a molecular weight of 13,000 or less obtained by mixing the aromatic polycarbonate resin with the polycarbonate copolymer having repeating units represented by the general formulae (A-1) and (A-2), some degree of discoloration occurs in a moist heat resistance test at more than 60° C. and more than 90% RH, though no problem of discoloration arises in a moist heat resistance test at 60° C. and 90% RH as general moist heat resistance conditions. There are no standardized criteria for the conditions of a moist heat resistance test for a light-guiding plate and the light-guiding plate is evaluated under conditions more severe than standard conditions in many cases. Accordingly, in the present invention, the alicyclic epoxy compound (C) is incorporated into the resin composition so that the resultant can correspond even to such severe moist heat resistance conditions as described above. Thus, excellent moist heat resistance, which cannot be obtained merely by blending the component (B) into the component (A) having a molecular weight as low as 13,000 or less, can be imparted to the resin composition.

In the present invention, the alicyclic epoxy compound refers to the following cyclic aliphatic compound: one oxygen atom is added to an ethylene bond in an aliphatic ring and the compound has an epoxy group. Specifically, compounds exemplified in the following formulae (1) to (10) can each be used. In addition, one of the alicyclic epoxy compounds (C) may be used alone, or two or more thereof may be used in combination.

(1)

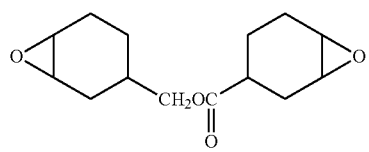

(2)

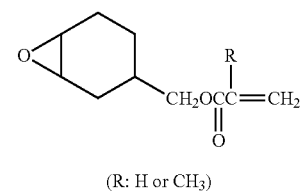

(R: H or CH$_3$)

(3)

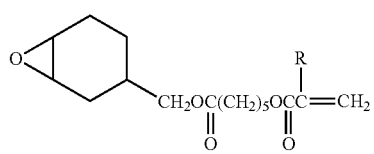

(R: H or CH$_3$)

(4)

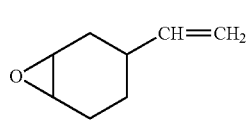

(5)

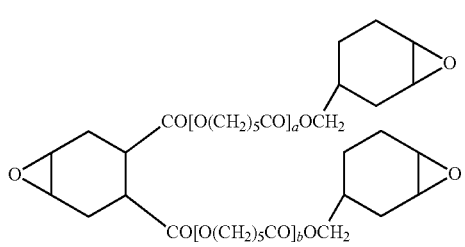

(a + b = 1 or 2)

(6)

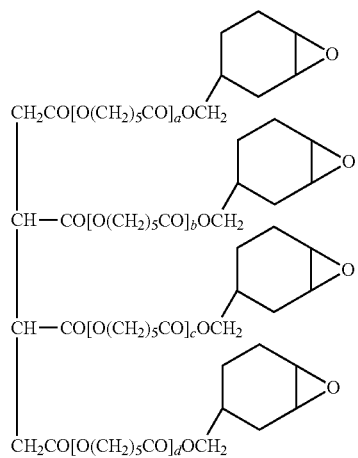

(a + b + c + d = 1 to 3)

(7)

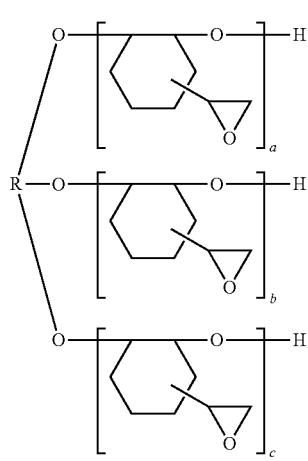

(a + b + c = n (integer), R: hydrocarbon group)

(8)

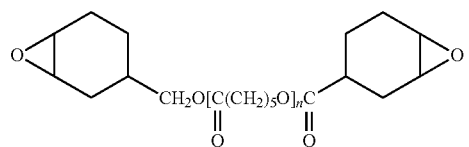

(n: integer)

(9)

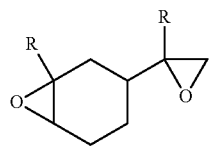

(R: hydrocarbon group)

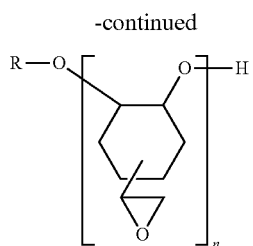

(R: hydrocarbon group, n: integer)

Among the alicyclic epoxy compounds, compounds represented by the formula (1), the formula (7), and the formula (10) are preferred, and 3,4-epoxycyclohexenylmethyl-3',4'-epoxycyclohexenecarboxylate (a commercial product thereof is, for example, a product available under the trade name "CELLOXIDE 2021P" from Daicel Chemical Industries, Ltd.), a 1,2-epoxy-4-(2-oxiranyl)cyclohexane adduct of 2,2-bis(hydroxymethyl)-1-butanol (a commercial product thereof is, for example, a product available under the trade name "EHPE3150" from Daicel Chemical Industries, Ltd.), and a mixture of these two kinds (a commercial product thereof is, for example, a product available under the trade name "EHPE3150CE" from Daicel Chemical Industries, Ltd.) are particularly suitable.

The content of the alicyclic epoxy compound (C) is 0.001 to 0.5 parts by mass, preferably 0.005 to 0.1 parts by mass, more preferably 0.01 to 0.05 parts by mass with respect to 100 parts by mass of the aromatic polycarbonate resin (A). When the content is less than 0.001 parts by mass, no suppressing effect on the hydrolysis of the antioxidant is obtained. When the content exceeds 0.5 parts by mass, the amount of a gas to be produced upon molding of the resin composition increases and silver occurs. In addition, such content causes a reduction in rigidity of the molded light-guiding plate.

A light-guiding plate that does not discolor even under the most severe moist heat resistance conditions, i.e., 85° C., 95% RH, and 500 hours can be obtained merely by, for example, blending 0.02 parts by mass of the component (C) into 100 parts by mass of the aromatic polycarbonate resin (A).

(Modified Silicone Compound)

A modified silicone compound can be incorporated into the resin composition of the present invention as required.

The modified silicone compound has at least one of functional group selected from an alkoxy group, a vinyl group, and a phenyl group, and is preferably, for example, a functional group-containing modified silicone compound (such as an organosiloxane) obtained by introducing at least one of group selected from a methoxy group, a vinyl group, and a phenyl group into a silicone compound.

The modified silicone compound serves to further improve the heat stability of the composition at the time of its molding; for example, the compound prevents external appearance failures such as yellowing and silver (silver streak) due to thermal deterioration at the time of the molding, and the inclusion of air bubbles.

The content of the modified silicone compound can be preferably selected from the range of 0.01 to 1 parts by mass with respect to 100 parts by mass of the aromatic polycarbonate resin (A) as appropriate.

When the content is 0.01 parts by mass or more, a heat stabilizing effect is sufficiently exhibited. When the content is 1 part by mass or less, a haze or the like does not occur in a molded article.

(Additive)

In addition, any of various additives may be blended into the resin composition of the present invention in addition to each component described above as required. Examples thereof include a light stabilizer such as a hindered amine-based light stabilizer, a flame retardant, a flame retardant aid, a release agent, an antistatic agent, and a colorant.

[Resin Composition]

(Removal of Foreign Matter)

The resin composition of the present invention is suitable for an optical molded article, in particular, a light-guiding plate. The light-guiding plate is subjected to a moist heat resistance test under such conditions as described in the foregoing. When the light-guiding plate that has been placed in a constant temperature and humidity chamber in the moist heat resistance test for a long time period is taken out, many cracks occur in the light-guiding plate in some cases. Although the cracks that have thus occurred close over time after the occurrence to be unobservable in some cases, their vestiges remain in many cases. The remaining of the vestiges precludes the light-guiding plate from functioning.

The inventors have made extensive studies on a cause for the occurrence of the cracks in the light-guiding plate after the moist heat resistance test, and as a result, have found that the cracks occur under the influences of: the amount of moisture to be absorbed into the light-guiding plate by the moist heat resistance test; and a foreign matter in the light-guiding plate.

That is, when a light-guiding plate made of polycarbonate having high water-absorbing property is placed in a constant temperature and humidity chamber under the conditions of a certain temperature and a certain humidity for a long time period, the light-guiding plate swells owing to its water absorption, a pressure in the light-guiding plate increases, and a creep strain occurs in the light-guiding plate. The polycarbonate resin has the following property: when the resin absorbs water, its static modulus of elasticity and creep modulus of elasticity reduce. Accordingly, the creep strain is liable to progress in the constant temperature and humidity chamber. It has been found that although the mere progress of the creep strain rarely develops into a crack, the presence of a foreign matter in the plate results in the occurrence of a crack from the foreign matter as a starting point.

When a polycarbonate resin has a smaller molecular weight, its creep modulus of elasticity becomes lower and its creep deformation is more liable to progress. Accordingly, a crack is more liable to occur in a light-guiding plate made of polycarbonate having a lower molecular weight. In addition, the coefficient of water absorption of the polycarbonate resin increases as a temperature in a constant temperature and humidity chamber increases and a humidity therein increases. Accordingly, more severe moist heat resistance conditions are conditions under which a crack is more liable to occur.

Here, the presence of a foreign matter serving as the starting point of a crack results in the occurrence of the crack, but the amount of occurrence of the crack varies depending on the size and amount of the foreign matter.

When the foreign matter is large, the foreign matter can be filtered and removed with the mesh or filter of a kneading machine. However, a large number of fine foreign matters pass through a general mesh or filter, and when the size of each of the foreign matters exceeds about 100 µm, the foreign matters each serve as the starting point of the crack even in a resin composition for a light-guiding plate having a molecular weight in excess of 15,000.

When the resin composition of the present invention is, for example, a resin composition for a general light-guiding plate having a molecular weight of about 13,000 to 15,000, foreign matters each having a size of 100 µm or less is not responsible for the occurrence of a crack. However, in the case of a low-molecular weight resin composition having a molecular weight of 13,000 or less, even a finer foreign matter causes a crack.

In view of the foregoing, it is preferred that per 100 g of a pellet obtained by melting and kneading the resin composition of the present invention, the number of foreign matters each having a size of 50 µm or more is 5 or less, the number of foreign matters each having a size of 20 µm or more and less than 50 µm is 20 or less, and the number of foreign matters each having a size of 5 µm or more and less than 20 µm is 200 or less.

Even when foreign matters each have a size of 50 µm or more, as long as the number of the foreign matters per 100 g of the pellet is 5 or less, the probability that the foreign matters enter a light-guiding plate is so low that the risk of the occurrence of a crack is low. In addition, even in the case of a molecular weight of 13,000 or less, as long as the number of foreign matters each having a size of less than 50 µm in 100 g of the pellet falls within the range, the agglomeration of the foreign matters does not occur. Accordingly, no crack occurs even under severe moist heat resistance conditions.

A filter, which is capable of removing foreign matters so that per 100 g of the pellet, the number of the foreign matters each having a size of 50 µm or more may be 5 or less, the number of the foreign matters each having a size of 20 µm or more and less than 50 µm may be 20 or less, and the number of the foreign matters each having a size of 5 µm or more and less than 20 µm may be 200 or less, is, for example, a pleated candle type melt filter obtained by setting, in a steel housing, a plurality of pleated type filter elements each obtained by sintering a laminate of many filters each having a mesh size of 50 µm to 5 µm, more preferably 20 µm to 5 µm.

A pellet containing an extremely small amount of foreign matters can be obtained with a kneading facility, which is obtained by placing the filter between a kneading machine and an extrusion die, by extruding a strand into a clean facility and pelletizing the strand. Further, the following pellet can be packaged through filling and wrapping under a clean environment without the entry of a new foreign matter from the outside: per 100 g of the pellet, the number of foreign matters each having a size of 50 µm or more is 5 or less, the number of foreign matters each having a size of 20 µm or more and less than 50 µm is 20 or less, and the number of foreign matters each having a size of 5 µm or more and less than 20 µm is 200 or less.

(Viscosity-Average Molecular Weight)

For example, such the method described above, the respective components to be used in the present invention can be: kneaded with a uniaxial or biaxial extruder; granulated with a pelletizer into a pellet shape suitable for injection molding; and processed into an optical molded article such as a light-guiding plate by a molding method such as an injection molding method.

In the present invention, the molecular weight of the granulated polycarbonate resin composition is about 10,000 to 20,000 when represented in the unit of a viscosity-average molecular weight in terms of the aromatic PC resin determined by using a viscosity number VN, and is appropriately adjusted depending on the applications of a light-guiding product. For example, when high rigidity, high impact resistance, high light resistance, high fatigue resistance, high moist heat resistance, or the like is required, the molecular weight is about 17,000 to 20,000. When general rigidity is required, the molecular weight is about 15,000 to 17,000.

The case where the molecular weight is set to 15,000 or less is, for example, the molding of a thin light-guiding plate or the like having a large screen size. In the case of the screen size of a general mobile phone, the molecular weight is about 13,000 to 15,000 and the Q value (280° C., 160 Kg) of the composition as an indicator of flowability ranges from 20 to $60\times10^{-2}$ ml/s. Further, in the case of, for example, a light-guiding plate for a thin smart phone or tablet PC having a wide screen size, the composition is finished to have a molecular weight of about 10,000 to 13,000 and a Q value (280° C., 160 Kg) of $60\times10^{-2}$ ml/s or more, preferably $75\times10^{-2}$ ml/s or more.

It should be noted that when the molecular weight becomes less than 10,000, the rigidity of the material becomes insufficient and its impact resistance reduces, and hence it becomes difficult to take out the material at the time of its injection molding. Accordingly, the extent to which the viscosity-average molecular weight can be reduced for an improvement in flowability is limited.

EXAMPLES

The present invention is described more specifically by way of Examples below but the present invention is not limited to Examples.

Respective components used in Examples and Comparative Examples are as described below.

<Aromatic Polycarbonate Resin (A)>

Homoaromatic PC resin (homoaromatic PC resin produced by using bisphenol A, manufactured by Idemitsu Kosan Co., Ltd., trade name: Tarflon FN1500, molecular weight: 14,500)

Homoaromatic PC resin (homoaromatic PC resin produced by using bisphenol A, manufactured by Idemitsu Kosan Co., Ltd., trade name: Tarflon FN1200, molecular weight: 12,000)

PC-PTMG copolymer (copolymer of polycarbonate oligomer and polytetramethylene glycol-bis(4-hydroxybenzoate), polytetramethylene glycol-bis(4-hydroxybenzoate) residue amount: 4.0 mass %, manufactured by Idemitsu Kosan Co., Ltd., trade name: Tarflon FD1400)

<Diphosphite Compound (B)>

Bis(2,4-dicumylphenyl)pentaerythritol diphosphite (manufactured by Dover Chemical Corporation, trade name: Doverphos S-9228PC, residual sodium content: 1 ppm by mass or less)

<Alicyclic Epoxy Compound (C)>

3,4-Epoxycyclohexenylmethyl-3',4'-epoxycyclohexenecarboxylate (manufactured by Daicel Chemical Industries, Ltd., trade name: CELLOXIDE 2021P)

<Antioxidant>

Bis(2,6-di-tert-butyl-4-methylphenyl)pentaerythritol diphosphite (manufactured by ADEKA CORPORATION, trade name: ADK STAB PEP36)

Tris(2,4-di-tert-butylphenyl)phosphite (manufactured by BASF Japan Ltd., trade name: Irgafos 168)

<Modified Silicone>

Organopolysiloxane having a phenyl group, a methoxy group, and a vinyl group (manufactured by Shin-Etsu Chemical Co., Ltd., trade name: KR511)

Examples 1 to 6, and Comparative Examples 1, 3, 6, and 7

The blending ratios of the respective components were set as shown in Tables 1 and 2. A pleated candle type melt filter in which 12 pleated type filter elements each having a pore diameter of 10 μm, manufactured by Nihon Pall Ltd., had been set was used. A strand of the components was extruded with a kneading facility, which had been obtained by placing the filter between a biaxial kneading machine available under the model name "TEX65α" from The Japan Steel Works, LTD. and an extrusion die, into a clean facility, and then the strand was pelletized with a strand cutter. The pelletized pellet was wrapped in a 25-Kg bag in a clean room by pneumatic transportation.

Comparative Examples 2, 4, 5, 8, and 9

The blending ratios of the respective components were set as shown in Table 2. A uniaxial extruder available under the model name "HS70" from ISHINAKA IRON WORKS, CO., LTD. was used, in which a combination of three 50-mesh sheets, two 100-mesh sheets, and one 150-mesh sheet had been placed in an extrusion die. In an exhaust type simple clean room, the components were kneaded and extruded with the extruder, and then the resultant strand was pelletized with a strand cutter. The pelletized pellet was wrapped in a 25-Kg bag by pneumatic transportation.

The measurement and performance tests of the pelletized resin composition obtained in each of the examples were performed as described below.

(1) Viscosity-Average Molecular Weight (Mv)

A viscosity-average molecular weight was calculated from an equation "Mv=430.4VN-2001.8", a viscosity number (VN) was measured in conformity with ISO 1628-4 (1999).

(2) Q Value: Flowability

The amount ($10^{-2}$ mL/sec) of a molten resin flowing out of a nozzle having a diameter of 1 mm and a length of 10 mm was measured with an elevated flow tester in conformity with JIS K7210 at 280° C. under a pressure of 160 kg.

(3) Number of Foreign Matters 100 g of the pellet before molding were collected and dissolved in a dichloromethane solution. After that, foreign matters were extracted by filtering the solution, and then the number and sizes of the foreign matters were measured with an optical microscope.

(4) Yellow Index (YI): Colorability
(4-1) Test Piece of Ordinary Molding

The pellet obtained in each of Examples and Comparative Examples was molded into a flat test piece (measuring 40 mm by 80 mm by 3.0 mm) with a 40-ton injection molding machine (model name: EC40N, manufactured by TOSHIBA MACHINE CO., LTD.) at a molding temperature of 350° C. for 20 seconds and at a mold temperature of 80° C.

The YI value of the resultant test piece was measured with a spectrophotometer (U-4100 Spectrophotometer manufactured by Hitachi High-Technologies Corporation) under the conditions of a C light source and a two-degree field of view.

(4-2) Test Piece of Retention Molding

The pellet obtained in each of Examples and Comparative Examples was molded into 20 shots of a flat test piece (measuring 40 mm by 80 mm by 3.0 mm) with a 40-ton injection molding machine (model name: EC40N, manufactured by TOSHIBA MACHINE CO., LTD.) at a cylinder temperature of 350° C. and a mold temperature of 80° C., and at a cycle of 20 seconds. After that, the cycle was changed to 150 seconds, the initial shot was defined as a zeroth shot, and a third shot (5 minutes after) was sampled and measured for its YI value in the same manner as in the section (4-1).

(4-3) Test Piece after Moist Heat Resistance Test

A flat test piece obtained by molding in the same manner as in the section (4-1) was subjected to a moist heat resistance test in which the test piece was left to stand under an environment having a temperature of 60° C. and a humidity of 90% RH for 1,000 hours, or was left to stand under an environment having a temperature of 85° C. and a humidity of 95% RH for 500 hours. After that, the YI value of each test piece was measured in the same manner as in the section (4-1).

(5) Presence or Absence of Crack after Moist Heat Resistance Test

A flat test piece obtained by molding in the same manner as in the section (4-1) was subjected to a moist heat resistance test in which the test piece was left to stand under an environment having a temperature of 60° C. and a humidity of 90% RH for 1,000 hours, or was left to stand under an environment having a temperature of 85° C. and a humidity of 95% RH for 500 hours. After that, the presence or absence of an internal crack in each test piece was visually observed, and a test piece having no crack was evaluated as A and a test piece having a crack was evaluated as X.

TABLE 1

| | | | Unit | Example 1 | Example 2 | Example 3 | Example 4 | Example 5 | Example 6 |
|---|---|---|---|---|---|---|---|---|---|
| Resin composition | (A) Homoaromatic PC resin | FN1500 | % | 100 | 65 | — | — | — | — |
| | | FN1200 | % | — | — | 100 | 65 | 75 | 75 |
| | PC-PTMG | FD1400 | % | — | 35 | — | 35 | 25 | 25 |
| | (B) Diphosphite compound | Doverphos S-9228PC | parts | 0.05 | 0.05 | 0.05 | 0.05 | 0.05 | 0.1 |
| | (C) Alicyclic epoxy compound | CELLOXIDE 2021P | parts | 0.02 | 0.02 | 0.02 | 0.02 | 0.02 | 0.02 |
| | Antioxidant | PEP36 (ADEKA) | parts | — | — | — | — | — | — |
| | | Irgafos 168 (BASF Japan Ltd.) | parts | — | — | — | — | — | — |
| | Modified silicone | KR511 | parts | 0.1 | 0.1 | 0.1 | 0.1 | 0.1 | 0.1 |
| Viscosity-average molecular weight (Mv) | | | | 14,000 | 13,600 | 11,300 | 11,800 | 11,700 | 11,700 |
| Q value (280° C., 160 kg) | | | $10^{-2}$ ml/s | 26 | 45 | 79 | 84 | 81 | 81 |
| Number of foreign matters (per 100 g of pellet) | Each having a size of 50 μm or more | | number | 3 | 2 | 2 | 3 | 4 | 4 |
| | Each having a size of 20 μm or more and less than 50 μm | | number | 5 | 12 | 6 | 14 | 17 | 8 |

TABLE 1-continued

|  |  |  | Unit | Example 1 | Example 2 | Example 3 | Example 4 | Example 5 | Example 6 |
|---|---|---|---|---|---|---|---|---|---|
|  |  | Each having a size of 5 μm or more and less than 20 μm | number | 48 | 105 | 62 | 120 | 155 | 82 |
| Performance evaluation | YI | 350° C., 20 seconds (ordinary molding) |  | 1.05 | 0.95 | 1.09 | 0.95 | 0.96 | 0.93 |
|  |  | 350° C., 5 minutes (retention molding) |  | 1.09 | 1 | 1.11 | 0.99 | 0.98 | 0.96 |
|  | YI after moist heat resistance test | 60° C. × 90% RH, 1,000 hours |  | 1.08 | 1.01 | 1.06 | 1.01 | 1.01 | 0.98 |
|  |  | 85° C. × 95% RH, 500 hours |  | 1.1 | 1.07 | 1.1 | 1.05 | 1.08 | 1.05 |
|  | Presence or absence of crack after moist heat resistance test | 60° C. × 90% RH, 1,000 hours |  | A | A | A | A | A | A |
|  |  | 85° C. × 95% RH, 500 hours |  | A | A | A | A | A | A |

TABLE 2

|  |  |  |  | Unit | Comparative Example 1 | Comparative Example 2 | Comparative Example 3 | Comparative Example 4 | Comparative Example 5 |
|---|---|---|---|---|---|---|---|---|---|
| Resin composition | (A) | Homoaromatic PC resin | FN1500 | % | 100 | 100 | 65 | 65 | 65 |
|  |  |  | FN1200 | % | — | — | — | — | — |
|  |  | PC-PTMG | FD1400 | % | — | — | 35 | 35 | 35 |
|  | (B) | Diphosphite compound | Doverphos S-9228PC | parts | 0.05 | — | 0.05 | — | — |
|  | (C) | Alicyclic Epoxy compound | CELLOXIDE 2021P | parts | — | — | — | — | 0.02 |
|  |  | Antioxidant | PEP36 (ADEKA) | parts | — | 0.05 | — | 0.05 | 0.05 |
|  |  |  | Irgafos 168 (BASF Japan Ltd.) | parts | — | — | — | — | — |
|  |  | Modified silicone | KR511 | parts | 0.1 | 0.1 | 0.1 | 0.1 | 0.1 |
|  | Viscosity-average molecular weight (Mv) |  |  |  | 14,000 | 14,000 | 13,600 | 13,600 | 13,600 |
|  | Q value (280° C., 160 kg) |  |  | $10^{-2}$ ml/s | 26 | 26 | 45 | 45 | 45 |
|  | Number of foreign matters (per 100 g of pellet) | Each having a size of 50 μm or more | | number | 4 | 121 | 2 | 150 | 185 |
|  |  | Each having a size of 20 μm or more and less than 50 μm | | number | 10 | 250 | 15 | 420 | 555 |
|  |  | Each having a size of 5 μm or more and less than 20 μm | | number | 75 | 1,210 | 155 | 1,425 | 1,820 |
| Performance evaluation | YI | 350° C., 20 seconds (ordinary molding) |  |  | 1.07 | 1.09 | 0.99 | 0.97 | 0.97 |
|  |  | 350° C., 5 minutes (retention molding) |  |  | 1.12 | 1.15 | 1.02 | 1.05 | 1.05 |
|  | YI after moist heat resistance test | 60° C. × 90% RH, 1,000 hours |  |  | 1.12 | 1.12 | 1.05 | 1.22 | 1.12 |
|  |  | 85° C. × 95% RH, 500 hours |  |  | 1.2 | 1.32 | 1.29 | 1.67 | 1.36 |
|  | Presence or absence of crack after moist heat resistance test | 60° C. × 90% RH, 1,000 hours |  |  | A | A | A | X | X |
|  |  | 85° C. × 95% RH, 500 hours |  |  | A | X | A | X | X |

|  |  |  |  | Unit | Comparative Example 6 | Comparative Example 7 | Comparative Example 8 | Comparative Example 9 |
|---|---|---|---|---|---|---|---|---|
| Resin composition | (A) | Homoaromatic PC resin | FN1500 | % | — | — | — | 65 |
|  |  |  | FN1200 | % | 100 | 75 | 75 | — |
|  |  | PC-PTMG | FD1400 | % | — | 25 | 25 | 35 |
|  | (B) | Diphosphite compound | Doverphos S-9228PC | parts | 0.05 | 0.05 | — | — |
|  | (C) | Alicyclic Epoxy compound | CELLOXIDE 2021P | parts | — | — | — | — |
|  |  | Antioxidant | PEP36 (ADEKA) | parts | — | — | 0.05 | — |
|  |  |  | Irgafos 168 (BASF Japan Ltd.) | parts | — | — | — | 0.05 |
|  |  | Modified silicone | KR511 | parts | 0.1 | 0.1 | 0.1 | 0.1 |
|  | Viscosity-average molecular weight (Mv) |  |  |  | 11,300 | 11,700 | 11,700 | 13,600 |
|  | Q value (280° C., 160 kg) |  |  | $10^{-2}$ ml/s | 79 | 81 | 81 | 45 |

TABLE 2-continued

|  |  |  | | | | | |
|---|---|---|---|---|---|---|---|
|  | Number of foreign matters (per 100 g of pellet) | Each having a size of 50 µm or more | number | 4 | 3 | 210 | 155 |
|  |  | Each having a size of 20 µm or more and less than 50 µm | number | 12 | 11 | 500 | 365 |
|  |  | Each having a size of 5 µm or more and less than 20 µm | number | 89 | 62 | 1,910 | 1,352 |
| Performance evaluation | YI | 350° C., 20 seconds (ordinary molding) |  | 1.1 | 0.96 | 0.96 | 1.01 |
|  |  | 350° C., 5 minutes (retention molding) |  | 1.15 | 1.01 | 1.02 | 1.3 |
|  | YI after moist heat resistance test | 60° C. × 90% RH, 1,000 hours |  | 1.2 | 1.33 | 1.51 | — |
|  |  | 85° C. × 95% RH, 500 hours |  | 1.35 | 1.45 | 2.3 | — |
|  | Presence or absence of crack after moist heat resistance test | 60° C. × 90% RH, 1,000 hours |  | A | A | X | X |
|  |  | 85° C. × 95% RH, 500 hours |  | A | A | X | X |

It is understood from Examples 1 to 6 that in the case of the aromatic polycarbonate resin composition of the present invention, even when the composition is placed in a constant temperature and humidity chamber whose conditions have been changed for a long time period, a molded article that does not discolor under any condition is obtained. In particular, it is understood from Examples 3 to 6 that even in the case of a viscosity-average molecular weight of 13,000 or less, an excellent effect of the present invention is exhibited in retention molding, and under such severe moist heat resistance conditions that the composition is left to stand under an environment having a temperature of 85° C. and a humidity of 95% RH for 500 hours.

In the case of each of Comparative Examples 2, 4, 5, and 8 where bis(2,6-di-tert-butyl-4-methylphenyl)pentaerythritol diphosphite was used, a molded article discolored under such severe moist heat resistance conditions as described above to the extent that the molded article could not be used as a light-guiding plate. In addition, in the case of Comparative Example 9 where tris(2,4-di-tert-butylphenyl) phosphite was used, a molded article discolored in high-temperature molding at about 340° C. to the extent that the molded article could not be used as a light-guiding plate. It is also understood that the occurrence of a crack is affected by the size and amount of a foreign matter.

INDUSTRIAL APPLICABILITY

The aromatic polycarbonate resin composition of the present invention is excellent in heat stability in high-temperature molding, and can provide a molded article that is excellent in light transmittance and luminance, and that does not cause discoloration or an internal crack even when exposed to a high-temperature and high-humidity environment for a long time period. Accordingly, the composition is suitable for an optical product such as a light-guiding plate, specifically, a large-screen and thin display product such as a smart phone or a tablet PC.

The invention claimed is:
1. An aromatic polycarbonate resin composition, comprising:
(A) 100 parts by mass of an aromatic polycarbonate resin (A);
(B) 0.005 to 0.5 parts by mass of a diphosphite compound (B) represented by formula (I); and
(C) 0.001 to 0.5 parts by mass of an alicyclic epoxy compound (C):

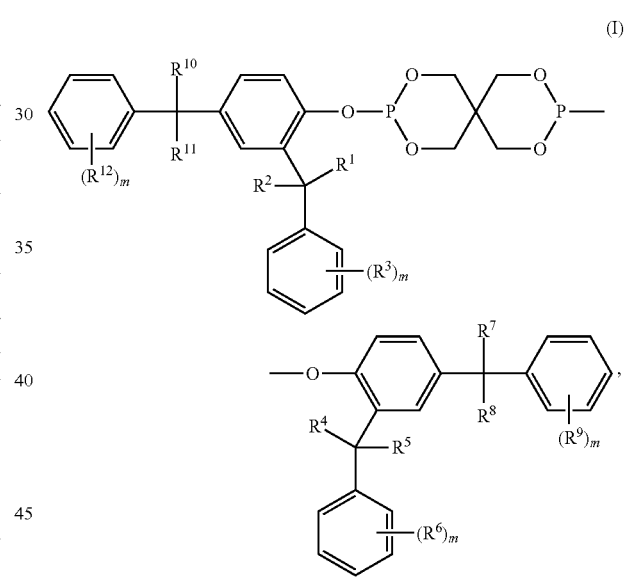

wherein:
a viscosity-average molecular weight of the aromatic polycarbonate resin (A) ranges from 10,000 to 15,000;
$R^1$, $R^2$, $R^4$, $R^5$, $R^7$, $R^8$, $R^{10}$, and $R^{11}$ each independently represent a hydrogen atom or an alkyl group having 1 to 4 carbon atoms that may have a substituent;
$R^3$, $R^6$, $R^9$, and $R^{12}$ each independently represent a group selected from the group consisting of an alkyl group having 1 to 4 carbon atoms, an aryl group having 6 to 12 carbon atoms, and an aralkyl group having 7 to 12 carbon atoms;
each m independently represents an integer of 0 to 3; and
a yellowness index value of a molded body formed from the aromatic polycarbonate resin composition with a 3.0 mm thickness ranges from 1.07 to 1.1 after performing a moist heat resistance test in which the molded body is left to stand under an environment having a temperature of 85° C. at a relative humidity of 95% for 500 hours.

2. The aromatic polycarbonate resin composition according to claim 1, wherein the aromatic polycarbonate resin (A) comprises 0 to 150 parts by mass of a polycarbonate copolymer having repeating units represented by formulae (a-1) and (a-2) with respect to 100 parts by mass of the aromatic polycarbonate resin (A):

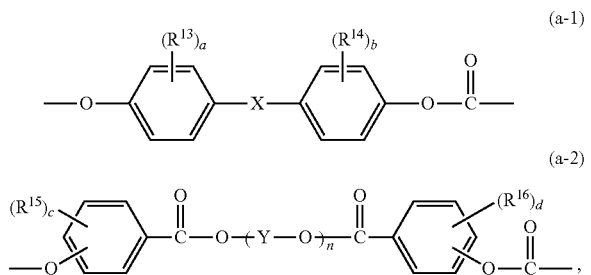

wherein:
$R^{13}$ and $R^{14}$ each independently represent an alkyl group having 1 to 6 carbon atoms;
X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—;
a and b each independently represent an integer of from 0 to 4;
$R^{15}$ and $R^{16}$ each independently represent an alkyl group having 1 to 3 carbon atoms;
Y represents a linear or branched alkylene group having 2 to 15 carbon atoms;
c and d each independently represent an integer of from 0 to 4; and
n represents an integer of from 2 to 200.

3. The aromatic polycarbonate resin composition according to claim 1, wherein the diphosphite compound (B) is bis(2,4-dicumylphenyl) pentaerythritol diphosphite.

4. The aromatic polycarbonate resin composition according to claim 1, wherein a residual sodium content in the diphosphite compound (B) is 3 ppm by mass or less.

5. The aromatic polycarbonate resin composition according to claim 1, wherein the alicyclic epoxy compound (C) comprises 3,4-epoxycyclohexenylmethyl-3',4'-epoxycyclohexenecarboxylate, a 1,2-epoxy-4-(2-oxiranyl) cyclohexane adduct of 2,2-bis(hydroxymethyl)-1-butanol, or a mixture thereof.

6. The aromatic polycarbonate resin composition according to claim 1, further comprising 0.01 to 1 parts by mass of a modified silicone compound with respect to 100 parts by mass of the aromatic polycarbonate resin (A).

7. The aromatic polycarbonate resin composition according to claim 1, wherein, per 100 g of a pellet obtained by melting and kneading the aromatic polycarbonate resin composition:
a number of foreign matters each having a size of 50 μm or more is 5 or less;
a number of foreign matters each having a size of 20 μm or more and less than 50 μm is 20 or less; and
a number of foreign matters each having a size of 5 μm or more and less than 20 μm is 200 or less.

8. The aromatic polycarbonate resin composition according to claim 7, wherein the pellet has a viscosity-average molecular weight ranging from 10,000 to 13,000 in terms of the aromatic polycarbonate resin (A).

9. An optical molded article, obtained by molding the aromatic polycarbonate resin composition according to claim 1.

10. The aromatic polycarbonate resin composition of claim 1, wherein a residual sodium content in the diphosphite compound (B) is 1 ppm by mass or less.

* * * * *